US006226399B1

(12) United States Patent
Robinson

(10) Patent No.: US 6,226,399 B1
(45) Date of Patent: May 1, 2001

(54) METHOD AND SYSTEM FOR IDENTIFYING AN IMAGE FEATURE AND METHOD AND SYSTEM FOR DETERMINING AN OPTIMAL COLOR SPACE FOR USE THEREIN

(75) Inventor: David A Robinson, Northants (GB)

(73) Assignee: Integral Vision, Inc., Farmington Hills, MI (US)

( * ) Notice: Subject to any disclaimer, the term of this patent is extended or adjusted under 35 U.S.C. 154(b) by 0 days.

(21) Appl. No.: 09/321,284

(22) Filed: May 27, 1999

(51) Int. Cl.$^7$ ........................................................ G06K 9/00
(52) U.S. Cl. ............................ 382/162; 382/165; 382/190
(58) Field of Search ..................................... 382/162, 165, 382/167, 190, 191, 224, 225

(56) References Cited

U.S. PATENT DOCUMENTS

| 4,414,635 | 11/1983 | Gast et al. |
| 4,653,014 | 3/1987 | Mikami et al. |
| 4,998,286 | * 3/1991 | Tsujiuchi ............................. 382/165 |
| 5,085,325 | 2/1992 | Jones et al. |
| 5,218,555 | 6/1993 | Komai et al. |
| 5,221,959 | 6/1993 | Ohyama et al. |
| 5,410,637 | 4/1995 | Kern et al. |
| 5,454,050 | * 9/1995 | Nakabayashi et al. ............. 382/165 |
| 5,552,805 | 9/1996 | Alpher. |
| 5,751,450 | 5/1998 | Robinson. |
| 5,872,865 | * 2/1999 | Normile et al. ..................... 382/224 |
| 5,911,003 | * 6/1999 | Sones ................................... 382/162 |

* cited by examiner

Primary Examiner—Phuoc Tran
(74) Attorney, Agent, or Firm—Brooks, Kushman P.C.

(57) ABSTRACT

A method and system are provided for identifying an image feature of an object. The system preferably includes a machine vision system for capturing an original color image of the object in a first color space defined by a first set of color axes to obtain a first set of image data. The first set of image data is transformed within the machine vision system to a second set of image data in an optimal color space having an optimal set of color axes which define an optimal direction wherein the amount of inter axis correlation of the second set of image data is minimized. The machine vision system then manipulates the second set of image data to identify the image feature. Color differences existing in the original color image are amplified and separation between chromatically different regions of the original color image are maximized in the optimal color space. Preferably, the optimal set of color axes are three orthogonal axes. The first set of image data is rotated to match the optimal direction. In this way, the first set of image data is reorganized along the optimal set of color axes. The machine vision system can also be utilized to capture a color image of an ideal object in the first color space to obtain an ideal set of image data and to compute the optimal set of color axes from the ideal set of image data wherein the optimal set of color axes is object specific.

10 Claims, 1 Drawing Sheet ated in a color space defined by the red, green, and blue axes, as illustrated in FIG. 2. This is primarily because both the human eye, and virtually all color cameras come equipped with sensors that are sensitive to these colors, and so it becomes second nature to operate in such a color space, or one closely related to it. However, in many images this choice of axes could be far from optimum, especially if there is any information common to the red, green, and blue axes.

METHOD AND SYSTEM FOR IDENTIFYING AN IMAGE FEATURE AND METHOD AND SYSTEM FOR DETERMINING AN OPTIMAL COLOR SPACE FOR USE THEREIN

TECHNICAL FIELD

This invention relates to methods and systems for identifying an image feature and methods and systems for determining an optimal color space for use therein.

BACKGROUND ART

A very important image processing tool used in machine vision automatically identifies given features within the image. Up to recently, this has almost always been accomplished using a monochrome system in conjunction with some form of search algorithm. However, there are situations where there is insufficient grey level difference between the intended target and the background for the target to be reliably identified in this manner. In many cases, switching from a monochrome imaging system to a color system can be of great assistance, relying on using color discrimination to separate the target from the background.

U.S. Pat. No. 5,751,450 discloses a tool which has been designed to ease the construction of such color based discriminators using what is, in effect, a programmable color filter. However, there is an important class of images in which the color difference is insufficient for the straight forward color filter to work effectively.

Conventionally, color images are captured and manipulated in a color space defined by the red, green, and blue axes, as illustrated in FIG. 2. This is primarily because both the human eye, and virtually all color cameras come equipped with sensors that are sensitive to these colors, and so it becomes second nature to operate in such a color space, or one closely related to it. However, in many images this choice of axes could be far from optimum, especially if there is any information common to the red, green, and blue axes.

An example of the worse case of such a distribution is shown in FIG. 2. Here, every pixel in a sample image is plotted in its correct position in the RGB color space. The result, in this case, has a very strong correlation to a straight line that is at an angle of 45° to all of the axes. With this type of distribution, the image information is effectively shared equally over the three color planes. Although this represents the most unfavorable type of distribution, it is not particularly uncommon - occurring anywhere that the predominant color is grey, for example imaging aluminum or stainless steel structures.

U.S. Pat. No. 4,653,014 to Mitcami et al. discloses a process for preparing discrimination criteria for identifying colors in a color identifying system. A computer-based system attempts to automatically determine the best way in which to be able to distinguish between single color samples. The system must be shown the color which it is trying to identify. It will then automatically derive the optimum parameters with which to be able to differentiate samples of these colors. It describes a spot measuring instrument rather than an area measuring instrument. Its output is essentially digital, inasmuch as the output result is that a sample is identified as being identical to one of the original samples. There is no way to quantitatively measuring how close, or how far the sample is from the original reference.

U.S. Pat. No. 5,218,555 to Komai et al. discloses a method for judging a color difference using rules and fuzzy inference and apparatus therefor. The color matching system is totally based on "fuzzy logic" and "fuzzy inference" components within its algorithm.

U.S. Pat. No. 5,410,637 to Kern et al. discloses a color tolerancing system employing fuzzy logic. This technique appears to be designed for matching a single color sample. As with the Komai et al. patent, the algorithm is totally reliant on "fuzzy logic".

U.S. Pat. No. 5,085,325 to Jones et al. discloses a color sorting system and method. The system uses a polar coordinate color specification. An external look up table is used to perform an acceptance/rejection flag. Digitized video goes straight into the hardware-implemented look up table for real-time speed.

U.S. Pat. No. 5,221,959 to Ohyama et al. discloses a color discrimination data input apparatus. The system modifies the spectral content of the illumination on an object in order to obtain the optimum separation of several classes of object based on differences in spectral reflectance of the objects being classified.

U.S. Pat. No. 4,414,635 to Gast et al. discloses a system for segmenting an image based on certain key hues. The system is trained on a series of keystone colors, each of which is given a label. These colors only cover a small segment of the color space, thereby leaving many colors unlabeled. In order to ensure that every color has a label, Gast uses color distance to determine which key color any unlabeled hue is closest to and allows that color to adopt the label of its neighboring key color. From this process, Gast generates a look up table whose address defines the color of the current pixel and the output generates the label. By scanning another image pixel by pixel, each part of the new image can be allocated a label. Gast extends the system to produce a complementary facility whereby labels can be converted back to the key color. Thus, by using a pre-trained segmenter to scan an image followed by a synchronized complementary system, Gast can generate a duplicate image which only contains the key hues.

U.S. Pat. No. 5,552,805 to Alpher is also related to the present invention.

DISCLOSURE OF INVENTION

An object of the present invention is to provide a method and system for identifying an image feature and method and system for determining an optimal color space for use therein wherein image features can be identified even though only small color differences exist between the image features and background of the image features.

Another object of the present invention is to provide a method and system for identifying an image feature and method and system for determining an optimal color space for use therein wherein image features of interest are enhanced by using a color axis rotation in an optimal direction.

In carrying out the above objects and other objects of the present invention, a method is provided for identifying an image feature of an object in a machine vision system. The method includes the step of capturing an original color image of the object in a first color space defined by a first set of color axes to obtain a first set of image data. The method also includes the step of transforming the first set of image data to a second set of image data in an optimal color space having an optimal set of color axes which define an optimal direction wherein the amount of inter axis correlation of the second set of image data is minimized. The method further includes the step of manipulating the second set of image data to identify the image feature wherein color differences existing in the original color image are amplified and separation between chromatically different regions of the original color image are maximized in the optimal color space.

Preferably, the optimal set of color axes are three orthogonal axes.

Typically, the step of transforming the first set of image data includes the step of chromatically rotating the first set of image data to match the optimal direction. In other words, the step of transforming the first set of image data includes the step of reorganizing the first set of image data along the optimal set of color axes.

The method may also include the steps of capturing a color image of an ideal object in the first color space to obtain an ideal set of image data and computing the optimal set of color axes from the ideal set of image data wherein the optimal set of color axes is object specific.

Further in carrying out the above objects and other objects of the present invention, a method is provided for determining an optimal color space defined by an optimal set of color axes for an object in a machine vision system. The method includes the steps of capturing a color image of an ideal object in a first color space having a first set of color axes to obtain an ideal set of image data and computing an optimal set of axes which define the optimal color space from the ideal set of image data. A first set of image data transformed from the first color space to the optimal color space based on the optimal set of axes results in a minimum amount of inter axis correlation of transformed image data in the optimal color space.

Still further in carrying out the above objects and other objects of the present invention, systems are provided for carrying out the above methods.

The advantages accruing to the methods and systems of the present invention are numerous. For example, a tool constructed and used in accordance with the present invention can either be used as a self standing color-based discriminator, or as a preprocessor for a standard color filter system, which effectively amplifies or exaggerates any color difference within an image.

The above objects and other objects, features, and advantages of the present invention are readily apparent from the following detailed description of the best mode for carrying out the invention when taken in connection with the accompanying drawings.

BRIEF DESCRIPTION OF DRAWINGS

FIG. 1 is a schematic diagram of a machine vision system in which the methods and systems of the present invention can be used;

BEST MODE FOR CARRYING OUT THE INVENTION

Figure 2:
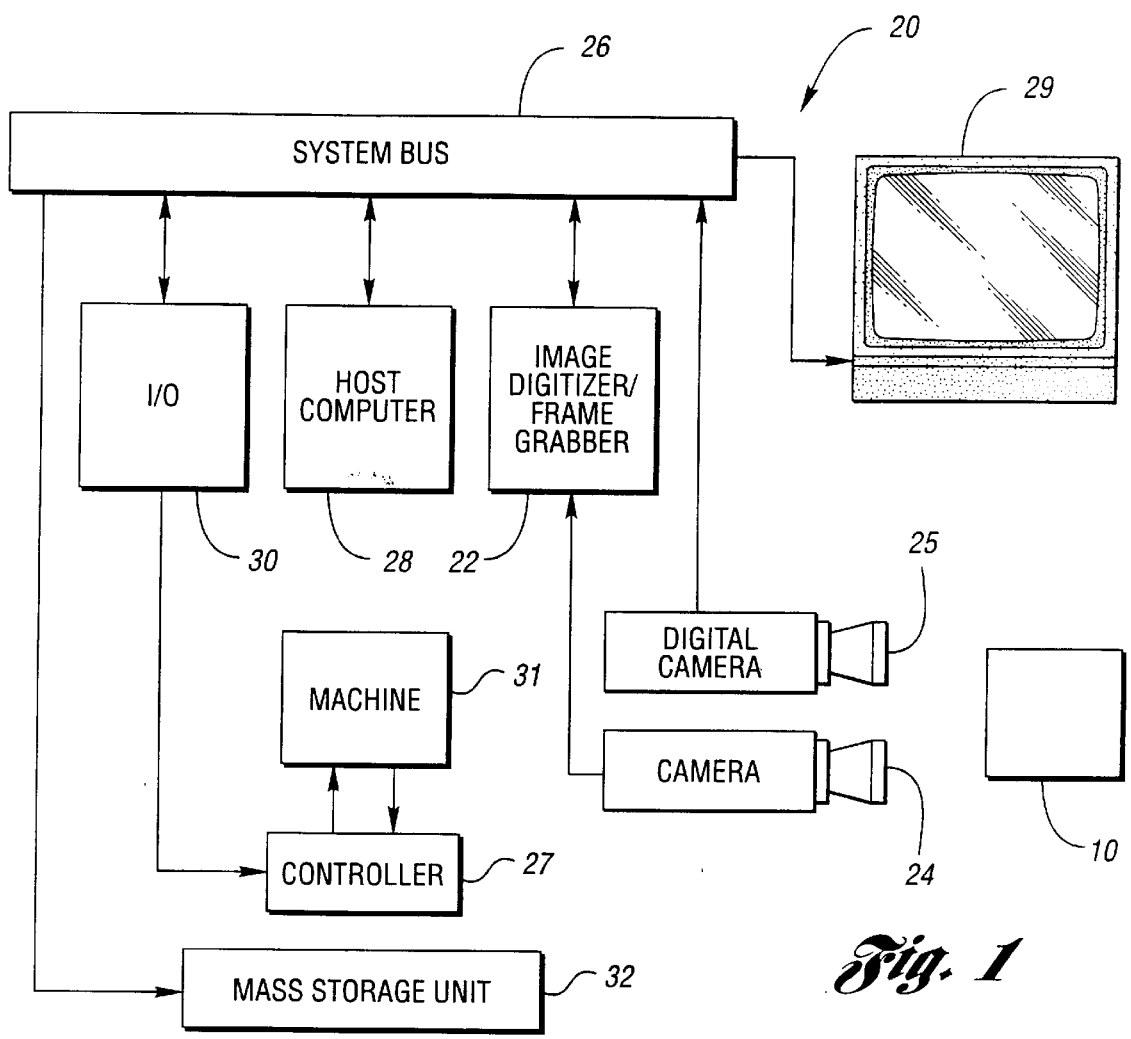
FIG. 2 is an RGB scatter plot illustrating the position of all of the pixels within an image as placed in the RGB color space.

In general, one aspect of the present invention provides a method and system to determine an optimal color space defined by an optimal set of color axes for an object. Another aspect of the present invention provides a method and system which utilize the optimal color space to identify an image feature of an object. The results of the identification can either be presented or displayed to an operator or else used in an automatic feedback loop to control a machine, a robot or a process or quality control.

Referring again to the drawing Figures, there is illustrated schematically in FIG. 1, a machine vision system, generally indicated at 20, by which the methods and systems of the present invention can: (1) automatically identify an image feature of an object 10; and (2) automatically determine an optimal color space for the object 10.

The machine vision system 20 typically includes an image digitizer/frame grabber 22. The image digitizer/frame grabber 22 samples and digitizes input images from an image source such as a sensor or color camera 24 and places each input image into a frame buffer having picture elements. Each of the picture elements may consist of three 8-bit numbers representing the brightness of that spot in red, green and blue regions of the spectrum in the image. A digital camera 25 coupled to a system bus 26 may be provided to eliminate the need for the image digitizer/frame grabber 22.

The system 20 also includes input/output circuits 30 to allow the system 20 to communicate with external devices such as a controller 27 for controlling a process or machine such as a machine 31.

The camera 24 may be an image source such as an analog, digital or line scan camera such as NTSC and PAL.

The system bus 26 may be either a PCI, an EISA, ISA or VL system bus or any other standard bus.

The image digitizer/frame grabber 22 may be a conventional three channel color frame grabber board such as that manufactured by Imaging Technologies, or other frame grabber manufacturers. Alternatively, the image digitizer/frame grabber 22 may comprise a vision processor board such as made by Cognex.

The machine vision system 20 may be programmed from a mass storage unit 32 to include custom controls for image processing and image analysis. Examples of image processing may include linear and non-linear enhancement, morphology, color and image arithmetic. Also, image analysis may include search, edge, caliper, blob, template, color, 2-D and 3-D measurements.

A signal processor or computer 28 of the system 20 may be a Pentium-based IBM compatible PC or other PC having a sufficient amount of RAM and hard disk space for performing the algorithms associated with the present invention as described hereinbelow.

Figure 3:
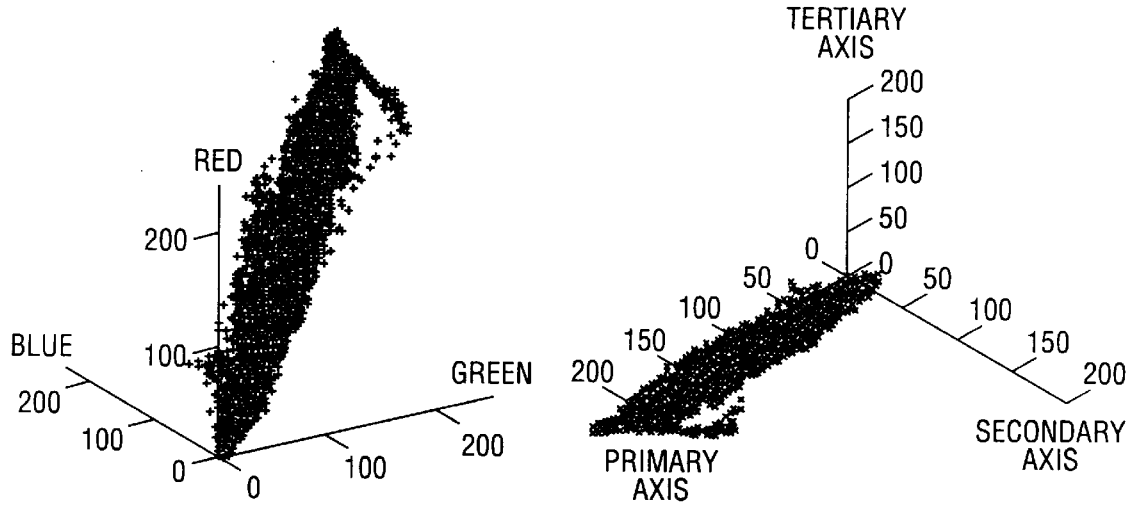
FIG. 3 is an optimal axis scatter plot illustrating the position of all of the pixels placed in an optimal color space of the present invention.

In one aspect of the present invention, in order to extract the most information from an image, one needs to define a set of three orthogonal axes in which there is only a minimum amount of inter axis correlation. That is to say little or no information is repeated on the three component images of a color image. With reference to FIG. 3, virtually all of the information is distributed along the so-called primary axis, with very little information in the secondary and tertiary planes. However, it is within the secondary and tertiary axis that most of the interesting detail is held. This can be seen by undertaking a scaling operation on all three transformed planes to scale them so that the darkest value is black and the brightest value is white. Axis transformation and scaling in effect amplifies the color differences existing on the original image.

The optimal set of color axes are the best set of orthogonal axes through any image which ensures that the correlation between the information on each of the planes is minimized.

In other words, such a set of axes ensures that chromatically different regions of the image are maximally separated. After the image has been transformed to the optimal color space, a color filter system may be used to isolate the image feature purely on color.

It follows, from the way that the axis position is calculated from the image data itself as described hereinbelow, that unlike R, G and B which are fixed universal reference coordinates to which all images are referred, the optimal set of axes is image specific. Computation of the direction of the optimal axes from the image data is a very laborious process. However, in a production-type environment in which many almost-identical objects are inspected, a pre-computed set of axes can be reused on all similar samples (however it is necessary to recompute the axes whenever the image task changes). The process of rotating the color space data to match this optimal direction can be accomplished very rapidly in a production environment.

Optimal Axis Transform From Principal Axis Transform

Consider an M*N three plane image. This image can be split into three M*N long vectors which represent the red, green and blue data. These vectors can be called $V'_R$, $V'_G$, and $V'_B$, respectively. Now consider subtracting the mean of each of these vectors from every element in the vector and then normalizing the magnitude of the vectors. These normalized vectors can be called $V_R$, $V_G$ and $V_B$.

Therefore, one has:

$$v_x = \frac{v_x - \mu_{v_x}}{|v_x - \mu_{v_x}|}$$

Now consider the nature of the function:

$$S_{X,Y} = \sum_{i}^{M*N} X_i * Y_i$$

where X and Y are two normalized M*N element vectors. $S_{XY}$ is a measure of the similarity of the data vectors X and Y, in loose terms a measure of the correlation of the two data sets. When the two data sets are identical, the function $S_{XX}$ is equal to unity. Conversely, when the two data sets are not correlated at all the function returns zero. The matrix S can be formed with the following elements:

$$S = \begin{bmatrix} S_{v_R v_R} & S_{v_R v_G} & S_{v_R v_B} \\ S_{v_R v_G} & S_{v_G v_G} & S_{v_G v_B} \\ S_{v_R v_B} & S_{v_G v_B} & S_{v_B v_B} \end{bmatrix}$$

If red, green and blue are the optimal axes in which to measure our image, then the matrix S will be diagonal (strictly S will be equal to 1). However, this, in general, is not the case and S will not be diagonal implying that the data is spread across more than one axis.

What is needed is to form a new set of axes from the existing set. These new axes take the form of a linear combination of the existing axes, that is:

$c_1R+c_2G+c_3B$.

The question one has to answer now is "What are the values of the $c_n$ such that S is diagonal when evaluated for data resolved into the new axis system?"

Fortunately, this is a relatively trivial mathematical problem to deal with. The 3*3 matrix S has three eigenvalues (in general, unless the data set is perfectly symmetrical these eigenvalues will be non-degenerative). Each of these eigenvalues has a corresponding eigenvector $f_n$. Now it is generally true that if one forms a matrix F from the eigenvectors of S in column form then the matrix L formed by the operation:

$F^TSF=\Lambda$ is diagonal. From this one can see that the axes required which make the matrix S diagonal are the eigenvectors of the matrix S.

It is clear from a series of investigation of the color axis transformation that the importance of the new axes in terms of the spread of data along them are proportional to the value of the corresponding eigenfunction. For example, in many images, all of the primary images represent the picture formed from the data which lies along the axis with the highest eigenvalue. In addition, it seems to be the case that any small detail lies along the axis with the smallest eigenvalue. These images are labeled tertiary images.

Once the eigenvectors of the matrix S have been computed, they can then be simply applied to any other image by taking the vector form of the new image and apply the following set of transform equations:

$$\text{Primary Axis Vector} = \text{Primary Axis} \cdot \begin{vmatrix} v'_R \\ v'_G \\ v'_B \end{vmatrix}$$

$$\text{Secondary Axis Vector} = \text{Secondary Axis} \cdot \begin{vmatrix} v'_R \\ v'_G \\ v'_B \end{vmatrix}$$

$$\text{Tertiary Axis Vector} = \text{Tertiary Axis} \cdot \begin{vmatrix} v'_R \\ v'_G \\ v'_B \end{vmatrix}$$

These three vectors can then be converted back into arrays of the same size as the original image by simply breaking it into line size fragments and stacking them in order.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for identifying an image feature of an object in a machine vision system, the method comprising the steps of:
    capturing an original color image of the object in a first color space defined by a first set of color axes to obtain a first set of image data;
    transforming the first set of image data to a second set of image data in an optimal color space having an optimal set of color axes which define an optimal direction wherein the amount of inter axis correlation of the second set of image data is minimized; and
    manipulating the second set of image data to identify the image feature wherein color differences existing in the original color image are amplified and separation between chromatically different regions of the original color image are maximized in t he optimal color space.

2. The method as claimed in claim 1 where in the optimal set of color axes are three orthogonal axes.

3. The method as claimed in claim 1 wherein the step of transforming the first set of image data includes the step of chromatically rotating the first set of image data to match the optimal direction.

4. The method as claimed in claim 1 wherein the step of transforming the first set of image data includes the step of reorganizing the first set of image data along the optimal set of color axes.

5. The method as claimed in claim 1 further comprising the steps of:
  capturing a color image of an ideal object in the first color space to obtain an ideal set of image data; and
  computing the optimal set of color axes from the ideal set of image data wherein the optimal set of color axes is object specific.

6. A system for identifying an image feature of an object, the system comprising:
  means for capturing an original color image of the object in a first color space defined by a first set of color axes to obtain a first set of image data;
  means for transforming the first set of image data to a second set of image data in an optimal color space having an optimal set of color axes which define an optimal direction wherein the amount of inter axis correlation of the second set of image data is minimized; and
  means for manipulating the second set of image data to identify the image feature wherein color differences existing in the original color image are amplified and separation between chromatically different regions of the original color image are maximized in the optimal color space.

7. The system as claimed in claim 6 wherein the optimal set of color axes are three orthogonal axes.

8. The system as claimed in claim 6 wherein the means for transforming the first set of image data includes means for chromatically rotating the first set of image data to match the optimal direction.

9. The system as claimed in claim 6 wherein the means for transforming the first set of image data includes means for reorganizing the first set of image data along the optimal set of color axes.

10. The system as claimed in claim 6 further comprising:
  means for capturing a color image of an ideal object in the first color space to obtain an ideal set of image data; and
  means for computing the optimal set of color axes from the ideal set of image data wherein the optimal set of color axes is object specific.

* * * * *